(12) United States Patent
Hashimoto

(10) Patent No.: US 9,110,270 B2
(45) Date of Patent: Aug. 18, 2015

(54) IMAGE PICKUP LENS

(71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 145 days.

(21) Appl. No.: 13/799,097

(22) Filed: Mar. 13, 2013

(65) Prior Publication Data

US 2013/0258499 A1    Oct. 3, 2013

(30) Foreign Application Priority Data

Mar. 29, 2012  (JP) .................................. 2012-075628
Apr. 2, 2012  (JP) .................................. 2012-084089

(51) Int. Cl.
 *G02B 9/60* (2006.01)
 *G02B 13/18* (2006.01)
 *G02B 3/02* (2006.01)
 *G02B 13/00* (2006.01)

(52) U.S. Cl.
 CPC .................................. *G02B 13/0045* (2013.01)

(58) Field of Classification Search
 USPC .................................................. 359/714, 766
 See application file for complete search history.

(56) References Cited

U.S. PATENT DOCUMENTS

| 7,911,711 B1 | 3/2011 | Tang et al. |
| 8,000,031 B1 * | 8/2011 | Tsai ............................... 359/714 |
| 8,179,615 B1 | 5/2012 | Tang et al. |
| 8,325,430 B1 | 12/2012 | Tsai |
| 8,456,758 B1 * | 6/2013 | Huang et al. ................... 359/714 |
| 2012/0194920 A1 | 8/2012 | Huang |

FOREIGN PATENT DOCUMENTS

| CN | 102269861 A | 12/2011 |
| CN | 102313970 A | 1/2012 |
| JP | 2009-294527 A | 12/2009 |
| JP | 2009-294528 A | 12/2009 |
| JP | 2010-26434 A | 2/2010 |
| JP | 2011-85733 A | 4/2011 |

* cited by examiner

*Primary Examiner* — Alicia M Harrington
(74) *Attorney, Agent, or Firm* — Westerman, Hattori, Daniels & Adrian, LLP

(57) ABSTRACT

An image pickup lens includes a first lens having a positive refractive power with a convex surface facing the object side, a second lens having a negative refractive power with a concave surface facing the image side, a third lens having a positive refractive power with a convex surface facing the object side, a fourth lens having both sides formed as aspheric surfaces and having a negative refractive power with a concave surface facing the image side, and a fifth lens having both sides formed as aspheric surfaces and having a positive refractive power with a concave surface facing the image side, wherein the first lens and the second lens satisfy following conditional expressions (1), (2) and (3);

$45 < v1 < 90$  (1)

$22 < v2 < 35$  (2)

$2.0 < v1/v2 < 2.6$  (3)

where v1 represents an Abbe number of the first lens, and v2 represents an Abbe number of the second lens.

18 Claims, 8 Drawing Sheets

IMAGE PICKUP LENS

The present application is based on and claims priority of Japanese patent application No. 2012-084089 filed on Apr. 2, 2012, and Japanese patent application No. 2012-075628 filed on Mar. 29, 2012, the entire contents of which are hereby incorporated by reference.

BACKGROUND OF THE INVENTION

1. Field of the Invention

The present invention relates to an image pickup lens for forming an image of an object on a solid imaging element such as a CCD sensor or a C-MOS sensor adopted in small-sized imaging devices. More specifically, the present invention relates to an image pickup lens composed of five lenses, which is built into an imaging device mounted on portable terminals such as cellular phones and smartphones, PDAs (Personal Digital Assistances), and game machines or information terminals such as personal computers and the like, where downsizing and thinning are pursued.

2. Description of the Related Art

Recently, the market of portable terminals having imaging devices is expanding more and more. Most portable terminals are equipped with a camera function, and currently, the majority of such camera functions has a large number of pixels comparable to that of digital cameras. Along with the increasing demands for thinning of portable terminals for reasons such as user-friendliness and design, demands for downsizing and thinning of the imaging devices built therein are also becoming severe. Further, for the image pickup lens mounted on imaging devices adopting such imaging elements having a large number of pixels, it is demanded to be even higher resolution, downsized, thinner and brighter (that is, with a small F-value). Also, it is strongly demanded for an imaging lens to have a wide angle of field suitable for taking an image in a wide area. In order to answer to the trend of downsizing, thinning and enhanced performance, the image pickup lens is usually composed of multiple lenses. Conventionally, image pickup lenses having a two or three lens configuration have been widely adopted for a VGA class to one-megapixel-class lens, because of an advantage in terms of its size and cost. Further, in order to adapt for increasing the number of pixels, many four-lens configuration image pickup lenses have been proposed. However, in order to cope with further downsizing and increase in the number of pixels, many image pickup lenses having a five-lens configuration, achievable a higher performance than the four-lens configuration, have been proposed. The present invention corresponds to such five-lens configuration.

For example, Japanese Patent Laid-Open No. 2009-294528 (Patent Document 1) discloses an image pickup lens having a five-lens configuration composed of, in order from an object side, a first lens having a positive power with an object side surface formed as a convex surface, a stop, a second lens having a meniscus shape near an optical axis, a third lens having an image side surface formed to have a convex shape near the optical axis, a fourth lens having both sides thereof formed as aspheric surfaces and where a circumference portion of an image-side surface is formed to have a convex shape, and a fifth lens having both sides thereof formed as aspheric surfaces and where a circumference portion of an image-side surface is formed to have a convex shape, wherein only one of the second to fifth lenses is a negative lens having an Abbe number of 30 or smaller.

Further, Japanese Patent Laid-Open No. 2010-026434 (Patent Document 2) discloses an image pickup lens having a five-lens configuration composed of, in order from an object side, a positive first lens, a positive second lens, a negative third lens, a positive fourth lens, and a negative fifth lens.

According to the image pickup lens disclosed in Patent Document 1, a ratio (TTL/2IH) of a total track length (TTL) to a maximum image height (IH) is approximately 1.0, so that relative downsizing of the lens is realized. However, the F-value of the lenses is approximately 3.0, which cannot be recognized as ensuring a sufficient brightness for imaging elements having increased number of pixels. As for the image pickup lens disclosed in Patent Document 2, it realizes a lens system having an F-value as bright as 2.05 to 2.5 and high aberration correction ability, but since the power of the first lens is weak, the configuration is disadvantageous for realizing a thinner lens.

SUMMARY OF THE INVENTION

The present invention aims at solving the above-mentioned problems of the prior art, by providing an image pickup lens which realizes downsizing and thinning of a five-lens configuration, has a small F-value, with various aberrations corrected satisfactorily, has a relatively wide angle of field, and can cope with cost reduction.

According to an aspect of the present invention, the image pickup lens is composed of five lenses, including, in order from an object side to an image-plane side, a first lens having a positive refractive power with a convex surface facing the object side, and a second lens having a negative refractive power with a concave surface facing the image side;

wherein the first lens and the second lens satisfy following conditional expressions (1), (2) and (3);

$$45 < v1 < 90 \quad (1)$$

$$22 < v2 < 35 \quad (2)$$

$$2.0 < v1/v2 < 2.6 \quad (3)$$

where v1 represents an Abbe number of the first lens, and v2 represents an Abbe number of the second lens, wherein the image pickup lens further includes a third lens having a positive refractive power with a convex surface facing the object side near an optical axis, a fourth lens having a negative refractive power with a concave surface facing the image side near the optical axis, and a fifth lens having a positive refractive power with a concave surface facing the image side near the optical axis, wherein both sides of the fourth and fifth lenses are formed as aspheric surfaces.

According to the image pickup lens having the above configuration, the three lenses out of the five-lens configuration are formed as positive lenses, so that the total track length can easily be shortened, and the two lenses are formed as negative lenses, so that the field curvature can easily be corrected. Further, both sides of the fourth and fifth lenses are formed to have appropriate aspheric shapes, so that the angle of the rays being incident on the imaging elements can be controlled.

Conditional expression (1) defines the Abbe number of the first lens, and conditional expression (2) defines the Abbe number of the second lens, so that both expressions show conditions for preferably correcting the chromatic aberration. If the Abbe number falls below the lower limit of conditional expression (1) or if the Abbe number exceeds the upper limit of conditional expression (2), the variance value between the first lens and the second lens becomes small, so that the correction of chromatic aberration becomes insufficient. Further, if the Abbe number exceeds the upper limit of conditional expression (1) or if the Abbe number falls below the lower limit of conditional expression (2), the balance between the axial chromatic aberration and the magnification chromatic aberration is deteriorated, and the performance at the circumference portion is deteriorated. Preferable correction of chromatic aberration is enabled by simultaneously satisfying both conditional expressions (1) and (2) and having the value fall within the range of conditional expression (3).

Further, the image pickup lens according to the present invention is preferably satisfied by a following conditional expression (4):

$$0.7 < f1/f < 0.9 \tag{4}$$

where f represents a focal length of the overall optical system of the image pickup lens, and f1 represents a focal length of the first lens.

Conditional expression (4) defines a positive power of the first lens with respect to the power of the overall lens system, which is a condition for realizing downsizing and preferable aberration correction.

If the positive power exceeds the upper limit of conditional expression (4), the positive power of the first lens with respect to the power of the overall lens system becomes weak, which is disadvantageous in shortening the total track length. On the other hand, if the positive power falls below the lower limit, the power of the first lens becomes too strong, which is not preferable since aberration correction becomes difficult and sensitivity of production error is increased.

Further, the image pickup lens according to the present invention should preferably satisfy a following conditional expression (5):

$$-1.3 < f2/f < -0.9 \tag{5}$$

where f2 represents a focal length of the second lens.

Conditional expression (5) defines the negative power of the second lens with respect to the power of the overall lens system, which is a condition for preferably correcting spherical aberration, coma aberration and axial chromatic aberration.

When the negative power exceeds the upper limit of conditional expression (5), correction of spherical aberration and coma aberration becomes difficult. On the other hand, when the negative power falls below the lower limit of conditional expression (5), the negative power of the second lens becomes too weak, and the correction of axial chromatic aberration becomes difficult.

Further, the image pickup lens according to the present invention, an aperture stop is preferably arranged on an object side of the first lens. By arranging the aperture stop on the object side of the first lens, the position of the exit pupil can be arranged distant from the image plane, so that the angle of incidence of rays to the imaging elements can be suppressed and a satisfactory image-side telecentric property can be ensured.

The aperture stop being arranged on the object side of the first lens includes the stop being arranged both closer to the object side than the cross point of the object side surface of the first lens with the optical axis, and between the cross point of the object side surface of the first lens with the optical axis and the circumference of the object side surface of the first lens.

Further, according to the present invention, both the fourth lens and the fifth lens of the image pickup lens are a meniscus lens having a concave surface facing the image side near the optical axis, and preferably having a pole-change point other than on the optical axis on the object side surface and the image side surface thereof. By forming the lenses to have such aspheric shape, it enables to correct the field curvature satisfactorily, while suppressing the angle of rays being incident on the imaging elements and improving telecentric properties thereby. Here, the term pole-change point refers to a point on the aspheric surface where a tangential plane crosses the optical axis perpendicularly.

Further, the image pickup lens according to the present invention is preferably satisfied by a following conditional expression (6):

$$1.1 < TTL/f < 1.3 \tag{6}$$

where TTL represents a calculated distance without a filter on the optical axis from the surface closest to the object side of the lens to the imaging surface.

Conditional expression (6) defines a ratio of the total track length to the focal length of the total optical system, which is a condition for shortening the total track length and correcting various aberrations satisfactorily.

If the ratio exceeds the upper limit of conditional expression (6), the margin regarding the shapes of the respective lenses is increased and various aberrations can be corrected even easier, however it results in an increase of the total track length and thinning becomes difficult to achieve. On the other hand, if the ratio falls below the lower limit of conditional expression (6), the total track length becomes too short, it results in the freedom of shaping respective lenses will be restricted and correction of various aberrations becomes difficult.

Further, according to the present invention, the image pickup lens is preferably satisfied by a following conditional expression (7):

$$-0.40 < r1/r2 < -0.15 \tag{7}$$

where r1 represents a curvature radius of an object side surface of the first lens, and r2 represents a curvature radius of an image side surface of the first lens.

Conditional expression (7) defines the paraxial shape of the first lens, which is a condition for shortening the total track length and suppressing the spherical aberration.

If the value exceeds the upper limit of conditional expression (7), the power of the object side surface of the first lens becomes stronger than that of the image side surface, resulting in an undesirable increase of the spherical aberration. On the other hand, if the value falls below the lower limit of conditional expression (7), the power of the object side surface of the first lens becomes too weak compared to that of the image side surface, resulting in disadvantageous for shortening of the total track length.

According to the present invention, the image pickup lens is preferably satisfied by a following conditional expression (8):

$$-5.0 < f4/f < -1.75 \tag{8}$$

where f4 represents a focal length of the fourth lens.

Conditional expression (8) defines the power of the fourth lens with respect to the power of the total lens system, which is a condition for shortening the total track length and performing satisfactory correction of the axial chromatic aberration.

If the power exceeds the upper limit of conditional expression (8), the negative power of the fourth lens with respect to the power of the overall lens system becomes high, which is disadvantageous in shortening the total track length. On the other hand, if the power falls below the lower limit of conditional expression (8), the axial chromatic aberration becomes too high, and this is also not preferable.

According to the present invention, the image pickup lens is preferably satisfied by a following conditional expression (9):

$$1.5 < f5/f < 4.0 \tag{9}$$

where f5 represents a focal length of the fifth lens.

Conditional expression (9) defines the positive power of the fifth lens with respect to the power of the overall lens system.

If the power exceeds the upper limit of conditional expression (9), the positive power of the fifth lens with respect to the power of the overall lens system becomes weak, which is disadvantageous in shortening the total track length. On the other hand, if the power falls below the lower limit of conditional expression (9), the positive power of the fifth lens with respect to the power of the overall lens system becomes too strong, which is advantageous in shortening the total track length, but the correction of distortion and field curvature becomes difficult.

Further, it is preferable that all the lenses constituting the image pickup lens of the present invention are formed of plastic materials. By adopting plastic materials for all the lenses, it becomes possible to enable mass production and facilitate cost reduction. Actually, the first lens, the third lens, the fourth lens and the fifth lens are all formed of the same material, which is a cycloolefin-based plastic material, and the second lens is formed of polycarbonate.

DETAILED DESCRIPTION OF THE PREFERRED EMBODIMENTS

Now, preferred embodiments of the present invention will be described in detail with reference to the drawings.

FIG. 1, FIG. 3, FIG. 5 and FIG. 7 respectively are general configuration diagrams of Embodiments 1 through 4 of the present embodiment. The basic lens configuration is identical in all embodiments, therefore, an explanation is given on the image pickup lens configuration of the present embodiment with reference to the general configuration diagram of Embodiment 1.

Figure 1:
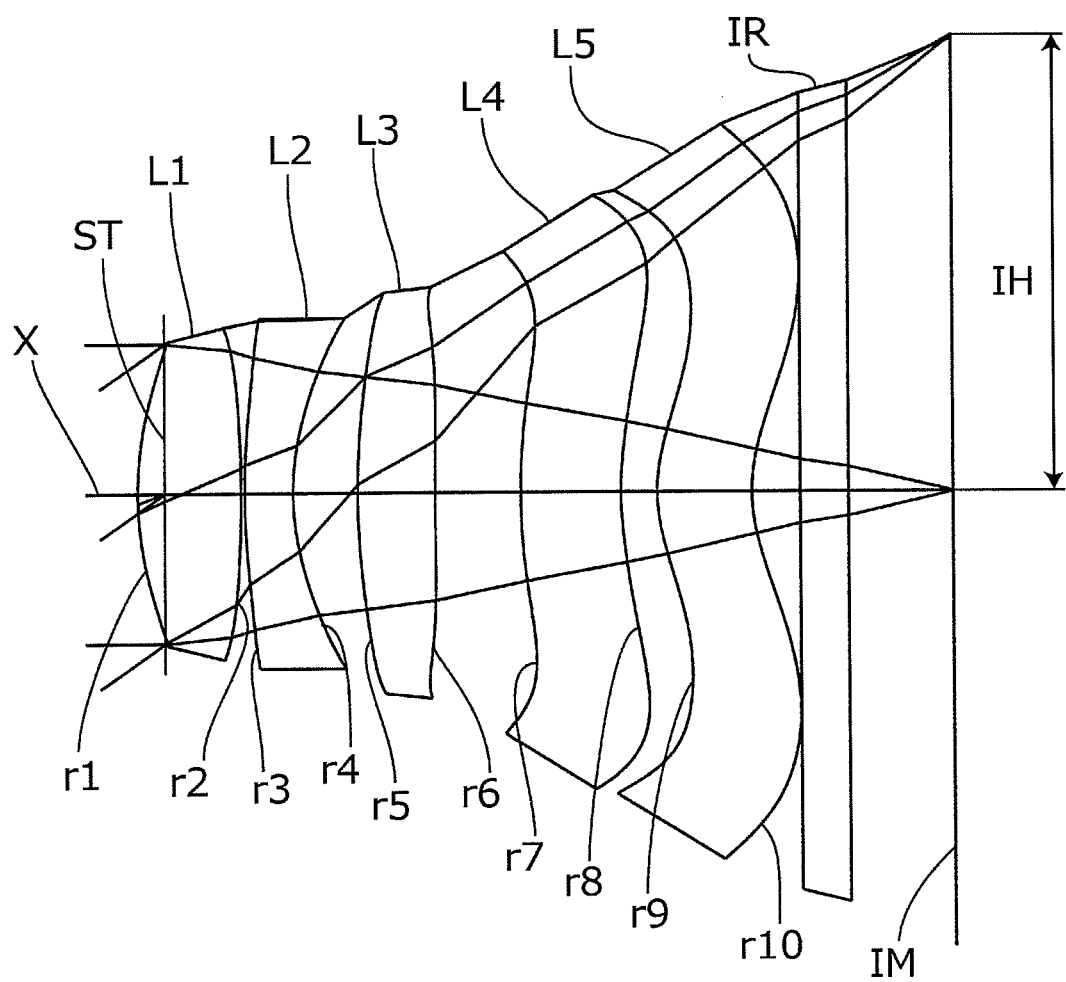
FIG. 1 is a view showing a general configuration of an image pickup lens according to Embodiment 1.

As is shown in FIG. 1, an image pickup lens of the present embodiment is composed of, in order from an object side to an image plane side, a first lens L1 having a positive refractive power, a second lens L2 having a negative refractive power, a third lens L3 having a positive refractive power, a fourth lens L4 having a negative refractive power, and a fifth lens L5 having a positive refractive power. An aperture stop ST is arranged on an object side of the first lens L1. A filter IR is arranged between the fifth lens L5 and an image plane IM. The filter IR can be omitted.

In the image pickup lens having the above-mentioned five-lens configuration, a first lens L1 is a biconvex lens with both an object side surface r1 and an image side surface r2 being a convex surface, a second lens L2 is a meniscus lens with an object side surface r3 of a convex surface and an image side surface r4 of a concave surface, a third lens L3 is a meniscus lens with an object side surface r5 of a convex surface near an optical axis X and an image side surface r6 of a concave surface, a fourth lens L4 is a meniscus lens with an object side surface r7 of a convex surface near the optical axis X and an image side surface r8 of a concave surface, and a fifth lens L5 is a meniscus lens with an object side surface r9 of a convex surface and an image side surface r10 of a concave surface.

As shown in Embodiments 3 and 4, the third lens L3 can have both the object side surface r5 and the image side surface r6 formed as convex surfaces.

According to the above-described configuration, of the lenses L1 through L5 constituting the five-lens configuration, the first lens L1, the third lens L3 and the fifth lens L5 are formed as positive lenses, so that the shortening of the total track length can be facilitated, and the second lens L2 and the fourth lens L4 are formed as negative lenses, so that the correction of chromatic aberration and field curvature can be facilitated. Furthermore, both surfaces of the forth lens L4 and the fifth lens L5 are formed to have an appropriate aspherical shape, so that telecentric properties of the rays being incident on the imaging elements are enhanced.

Furthermore, all the image pickup lenses of the present embodiments adopt plastic materials. In all the embodiments, the first lens L1, the third lens L3, the fourth lens L4 and the fifth lens L5 are formed of cycloolefin-based plastic material, and the second lens L2 is formed of polycarbonate.

By adopting plastic materials for all the lenses, it enables for stable mass production and facilitate cost reduction. Since the first lens L1, the third lens L3, the fourth lens L4 and the fifth lens L5 are formed of the same material, it enables its fabrication to be facilitated.

The image pickup lens according to the present invention satisfies the following conditional expression.

$$45 < v1 < 90 \quad (1)$$

$$22 < v2 < 35 \quad (2)$$

$$2.0 < v1/v2 < 2.6 \quad (3)$$

$$0.7 < f1/f < 0.9 \quad (4)$$

$$-1.3 < f2/f < -0.9 \quad (5)$$

$$1.1 < TTL/f < 1.3 \quad (6)$$

$$-0.40 < r1/r2 < -0.15 \quad (7)$$

$$-5.0 < f4/f < -1.75 \quad (8)$$

$$1.5 < f5/f < 4.0 \quad (9)$$

where
v1: Abbe number of the first lens
v2: Abbe number of the second lens
f: focal length of the overall optical system of the image pickup lens
f1: focal length of the first lens
f2: focal length of the second lens
f4: focal length of the fourth lens
f5: focal length of the fifth lens
TTL: distance on the optical axis from the object side surface of the first lens having the filter removed to the image plane
r1: curvature radius of object side surface of the first lens
r2: curvature radius of image side surface of the first lens In the present embodiment, the lens surfaces of all lenses are formed of aspheric surfaces. The aspheric shape adopted in these lens surfaces is represented by the following expression 1, when an axis in the optical axis direction is denoted as Z, a height in a direction orthogonal to the optical axis is denoted as H, a conic constant is denoted as k, and aspheric coefficients are denoted as A4, A6, A8, A10, A12, A14 and A16.

$$Z = \frac{\frac{H^2}{R}}{1 + \sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, preferred embodiments of the image pickup lens according to the present embodiments are shown. In each embodiment, f represents a focal length of the overall image pickup lens system, Fno represents an F number, ω represents a half angle of field, and IH represents a maximum image height. Further, i represents a surface number counted from the object side, r represents a curvature radius, d represents a distance between lens surfaces on the optical axis (surface distance), Nd represents a refractive index with respect to d-ray (reference wavelength), and νd represents an Abbe number with respect to the d-ray. Aspheric surface will be shown with a sign * (asterisk) after the surface number i.

Embodiment 1

Basic lens data will be shown in Table 1 below.

TABLE 1

Embodiment 1
Unit mm f = 4.109
Fno = 2.20
ω = 34.89
IH = 2.856

Surface data

| Surface No. i | Curvature radius r | Surface distance d | Refractive index Nd | Abbe number νd |
| --- | --- | --- | --- | --- |
| (Object surface) | Infinity | Infinity | | |
| Stop | Infinity | −0.17 | | |
| 1* | 2.1489 | 0.645 | 1.535 | 56.160 |
| 2* | −8.2149 | 0.023 | | |
| 3* | 4.2662 | 0.302 | 1.614 | 25.577 |
| 4* | 1.6236 | 0.4023 | | |
| 5* | 4.5097 | 0.4861 | 1.535 | 56.160 |
| 6* | 21.1852 | 0.5365 | | |
| 7* | 3.9426 | 0.6314 | 1.535 | 56.160 |
| 8* | 1.9422 | 0.2267 | | |
| 9* | 0.9975 | 0.5925 | 1.535 | 56.160 |
| 10* | 1.0772 | 0.35 | | |
| 11 | Infinity | 0.3 | 1.517 | 64.198 |
| 12 | Infinity | 0.6068 | | |
| Image Plane | Infinity | | | |

Single lens data

| Lens | Start plane | Focal length |
| --- | --- | --- |
| 1 | 1 | 3.240 |
| 2 | 3 | −4.422 |
| 3 | 5 | 10.555 |
| 4 | 7 | −8.007 |
| 5 | 9 | 6.973 |

Aspheric data

| | First surface | Second surface | Third surface | Fourth surface | Fifth surface |
| --- | --- | --- | --- | --- | --- |
| k | 0.000E+00 | 0.000E+00 | 0.000E+00 | 0.000E+00 | 0.000E+00 |
| A4 | −2.117E−02 | 1.812E−02 | −5.379E−02 | −1.095E−01 | −2.784E−02 |
| A6 | −4.623E−03 | −7.453E−02 | 9.387E−03 | 7.311E−02 | 1.933E−02 |
| A8 | −8.926E−03 | 3.686E−02 | −1.272E−02 | −6.365E−02 | −7.745E−03 |
| A10 | −9.320E−03 | −1.230E−02 | 1.637E−02 | 2.498E−02 | −3.340E−03 |
| A12 | 0.000E+00 | 0.000E+00 | 0.000E+00 | 0.000E+00 | 2.097E−03 |
| A14 | 0.000E+00 | 0.000E+00 | 0.000E+00 | 0.000E+00 | 3.267E−03 |
| A16 | 0.000E+00 | 0.000E+00 | 0.000E+00 | 0.000E+00 | −1.046E−03 |

TABLE 1-continued

Embodiment 1
Unit mm

|  | Sixth surface | Seventh surface | Eighth surface | Ninth surface | Tenth surface |
|---|---|---|---|---|---|
| k | 0.000E+00 | 0.000E+00 | −3.649E+01 | −5.604E+00 | −4.108E+00 |
| A4 | −3.851E−02 | 1.232E−02 | 3.099E−02 | −9.334E−02 | −8.296E−02 |
| A6 | −2.759E−02 | −7.016E−02 | −1.798E−02 | −4.533E−03 | 1.695E−02 |
| A8 | 2.542E−02 | 3.997E−02 | 4.675E−04 | 1.187E−02 | −2.682E−03 |
| A10 | −2.442E−04 | −2.197E−02 | −2.736E−04 | −6.781E−04 | 3.040E−04 |
| A12 | −6.720E−03 | 4.515E−03 | 0.000E+00 | −6.982E−04 | −1.981E−05 |
| A14 | 1.522E−03 | 0.000E+00 | 0.000E+00 | −1.354E−04 | −5.846E−06 |
| A16 | 1.236E−03 | 0.000E+00 | 0.000E+00 | 5.108E−05 | 9.419E−07 |

The image pickup lens according to Embodiment 1 satisfies all conditional expressions (1) through (9), as shown in Table 5.

Figure 2:
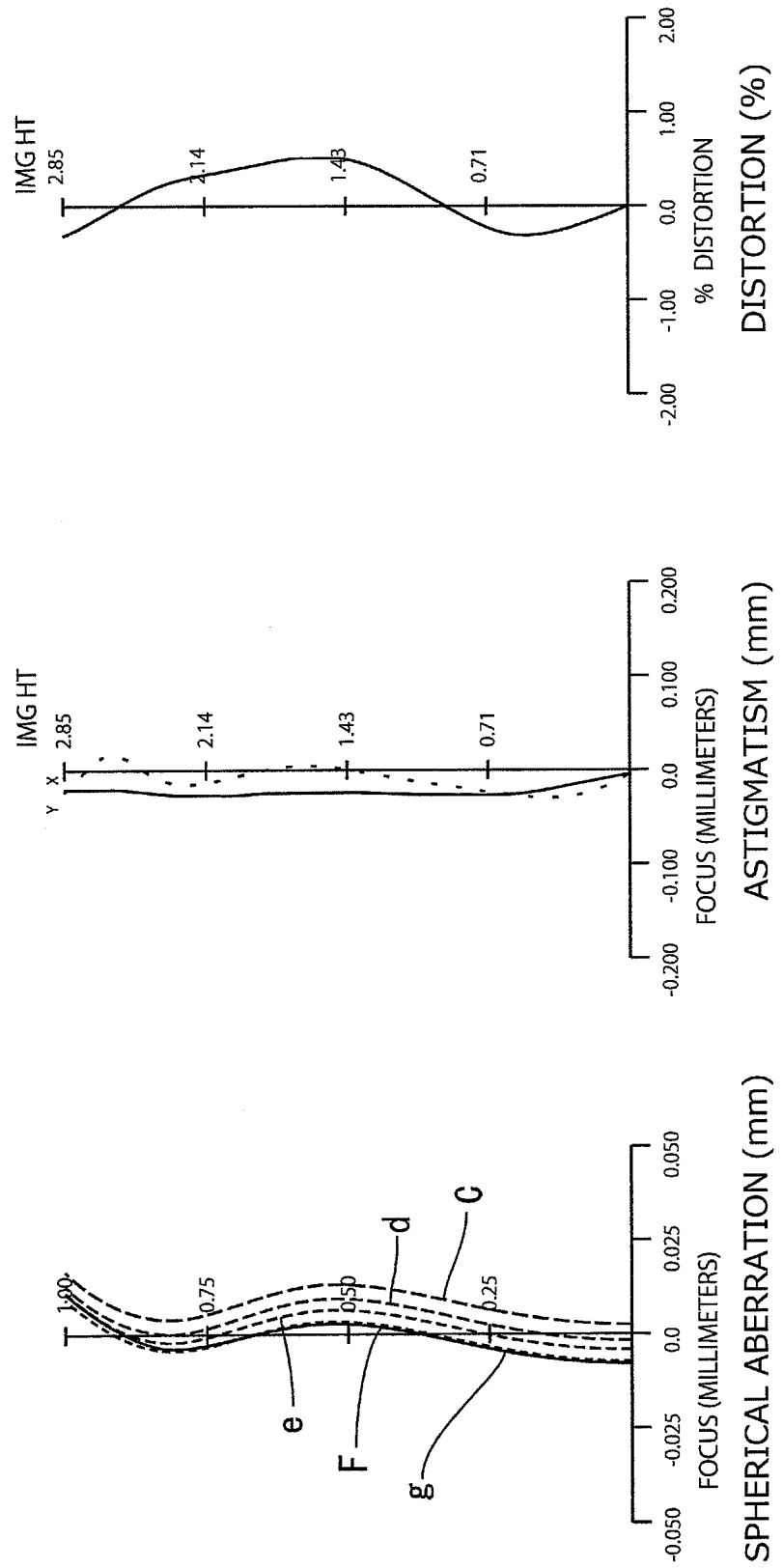
FIG. 2 is a view showing a spherical aberration, an astigmatism and a distortion of the image pickup lens according to Embodiment 1.
Figure 3:
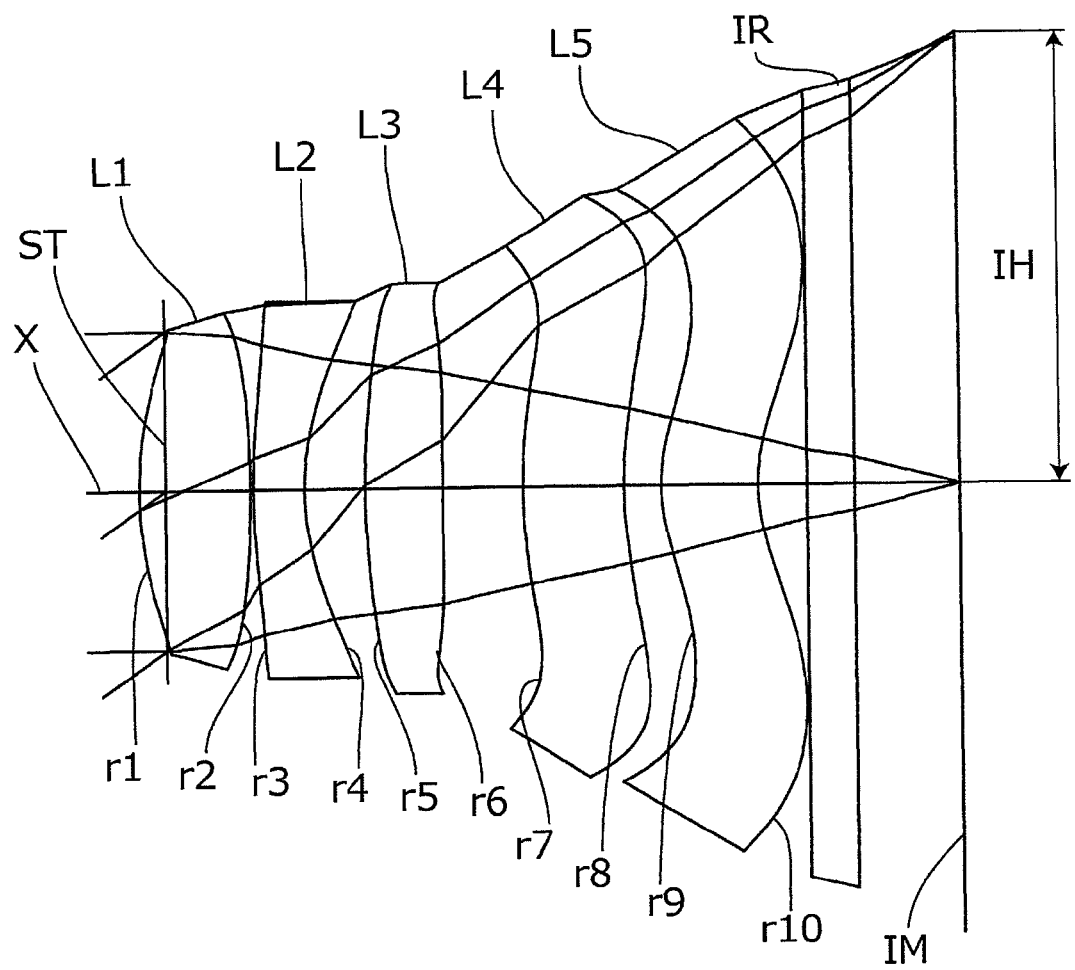
FIG. 3 is a view showing a general configuration of the image pickup lens according to Embodiment 2.

FIG. 2 shows a spherical aberration (mm), an astigmatism (mm), and a distortion (%) of the image pickup lens according to Embodiment 1. These aberration diagrams illustrate the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 2, it can be seen that the respective aberrations are satisfactorily corrected.

Further, the total track length TTL is as short as 4.991 mm and the ratio thereof to the maximum image height IH (TTL/2IH) is 0.874, so that downsizing is realized even in a five-lens configuration. Moreover, the F-value is as bright as 2.20, and the half angle of field is approximately 35°, which means that a comparatively wide angle of field is achieved.

Embodiment 2

Basic lens data will be shown in Table 2 below.

TABLE 2

Embodiment 2
Unit mm $f = 4.132$
$Fno = 2.05$
$\omega = 34.66$
$IH = 2.856$

Surface data

| Surface No. i | Curvature radius r | Surface distance d | Refractive index Nd | Abbe number νd |
|---|---|---|---|---|
| (Object surface) | Infinity | Infinity | | |
| Stop | Infinity | −0.17 | | |
| 1* | 2.317 | 0.703 | 1.535 | 56.160 |
| 2* | −6.466 | 0.023 | | |
| 3* | 4.3996 | 0.3216 | 1.614 | 25.577 |
| 4* | 1.6494 | 0.3864 | | |
| 5* | 5.032 | 0.4858 | 1.535 | 56.160 |
| 6* | 20.301 | 0.5099 | | |
| 7* | 3.75 | 0.6418 | 1.535 | 56.160 |
| 8* | 2.2043 | 0.239 | | |
| 9* | 1.0761 | 0.6148 | 1.535 | 56.160 |
| 10* | 1.1228 | 0.31 | | |
| 11 | Infinity | 0.3 | 1.517 | 64.198 |
| 12 | Infinity | 0.6672 | | |
| Image Plane | Infinity | | | |

Single lens data

| Lens | Start plane | Focal length |
|---|---|---|
| 1 | 1 | 3.269 |
| 2 | 3 | −4.456 |
| 3 | 5 | 12.325 |
| 4 | 7 | −11.651 |
| 5 | 9 | 8.607 |

Aspheric data

|  | First surface | Second surface | Third surface | Fourth surface | Fifth surface |
|---|---|---|---|---|---|
| k | 0.000E+00 | 0.000E+00 | 0.000E+00 | 0.000E+00 | 0.000E+00 |
| A4 | −2.099E−02 | 2.086E−02 | −5.400E−02 | −1.133E−01 | −2.958E−02 |

TABLE 2-continued

Embodiment 2
Unit mm

|     |            |            |            |            |            |
| --- | ---------- | ---------- | ---------- | ---------- | ---------- |
| A6  | −4.167E−03 | −7.287E−02 | 8.212E−03  | 7.166E−02  | 2.067E−02  |
| A8  | −6.781E−03 | 3.669E−02  | −1.508E−02 | −6.390E−02 | −6.801E−03 |
| A10 | −6.771E−03 | −1.165E−02 | 1.249E−02  | 2.004E−02  | −3.312E−03 |
| A12 | 0.000E+00  | 0.000E+00  | 0.000E+00  | 0.000E+00  | 1.848E−03  |
| A14 | 0.000E+00  | 0.000E+00  | 0.000E+00  | 0.000E+00  | 3.163E−03  |
| A16 | 0.000E+00  | 0.000E+00  | 0.000E+00  | 0.000E+00  | −1.033E−03 |

|     | Sixth surface | Seventh surface | Eighth surface | Ninth surface | Tenth surface |
| --- | ------------- | --------------- | -------------- | ------------- | ------------- |
| k   | 0.000E+00     | 0.000E+00       | −4.511E+01     | −5.884E+00    | −4.018E+00    |
| A4  | −4.349E−02    | 1.490E−02       | 3.359E−02      | −9.054E−02    | −8.187E−02    |
| A6  | −2.855E−02    | −6.940E−02      | −1.927E−02     | −6.254E−03    | 1.706E−02     |
| A8  | 2.643E−02     | 3.936E−02       | 4.407E−04      | 1.213E−02     | −2.759E−03    |
| A10 | 3.512E−04     | −2.208E−02      | −3.767E−04     | −6.063E−04    | 3.289E−04     |
| A12 | −6.477E−03    | 4.611E−03       | 0.000E+00      | −7.167E−04    | −1.526E−05    |
| A14 | 1.632E−03     | 0.000E+00       | 0.000E+00      | −1.384E−04    | −5.627E−06    |
| A16 | 1.211E−03     | 0.000E+00       | 0.000E+00      | 5.204E−05     | 7.311E−07     |

The image pickup lens according to Embodiment 2 satisfies all conditional expressions (1) through (9), as shown in Table 5.

Figure 4:
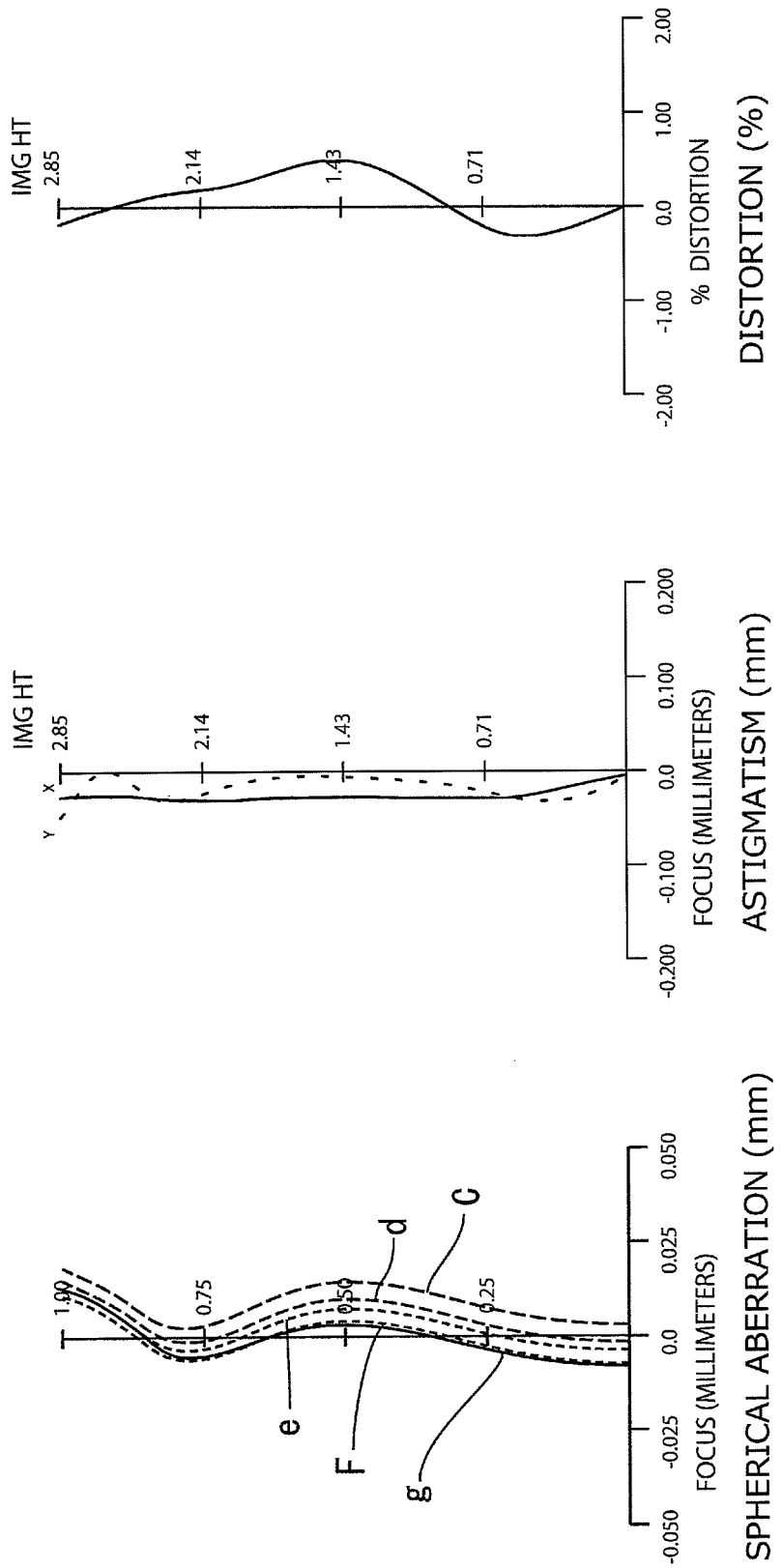
FIG. 4 is a view showing a spherical aberration, an astigmatism and a distortion of the image pickup lens according to Embodiment 2.
Figure 5:
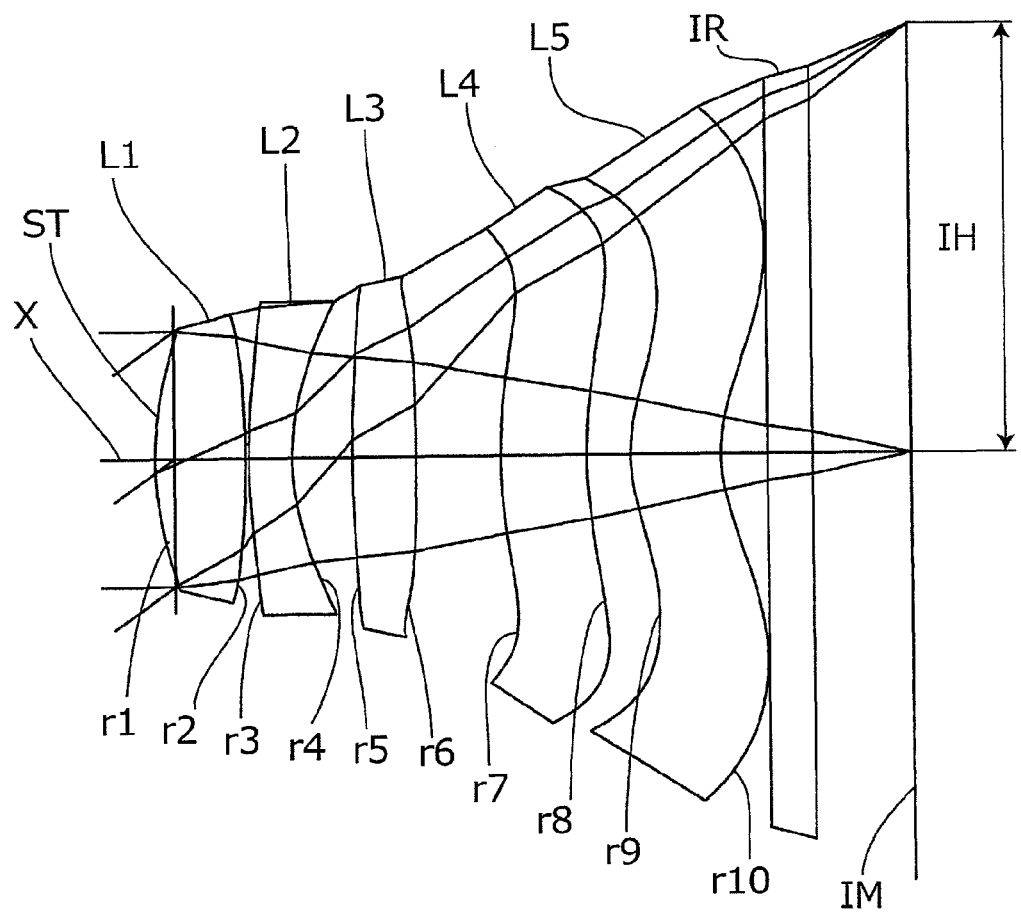
FIG. 5 is a view showing a general configuration of the image pickup lens according to Embodiment 3.

FIG. 4 shows a spherical aberration (mm), an astigmatism (mm), and a distortion (%) of the image pickup lens according to Embodiment 2. These aberration diagrams illustrate the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 4, it can be seen that the respective aberrations are satisfactorily corrected. Further, the total track length TTL is as short as 5.093 mm and a ratio thereof to the maximum image height IH (TTL/2IH) is 0.882, so that downsizing is realized even in a five-lens configuration. Moreover, the F-value is as bright as 2.05, and the half angle of field of the lens is approximately 35°, which means that a relatively wide angle of field is achieved.

Embodiment 3

Basic lens data will be shown in Table 3 below.

TABLE 3

Embodiment 3
Unit mm f = 4.073
Fno = 2.40
ω = 35.07
IH = 2.856

Surface data

| Surface No. i    | Curvature radius r | Surface distance d | Refractive index Nd | Abbe number vd |
| ---------------- | ------------------ | ------------------ | ------------------- | -------------- |
| (Object surface) | Infinity           | Infinity           |                     |                |
| Stop             | Infinity           | −0.13              |                     |                |
| 1*               | 2.17467            | 0.602              | 1.535               | 56.160         |
| 2*               | −6.92385           | 0.0235             |                     |                |
| 3*               | 4.00254            | 0.2874             | 1.614               | 25.577         |
| 4*               | 1.56802            | 0.397              |                     |                |
| 5*               | 6.60849            | 0.4259             | 1.535               | 56.160         |
| 6*               | −197.973           | 0.5703             |                     |                |
| 7*               | 3.7303             | 0.5753             | 1.535               | 56.160         |
| 8*               | 2.5658             | 0.2925             |                     |                |
| 9*               | 1.1317             | 0.6042             | 1.535               | 56.160         |
| 10*              | 1.0732             | 0.31               |                     |                |
| 11               | Infinity           | 0.3                | 1.517               | 64.198         |
| 12               | Infinity           | 0.6559             |                     |                |
| Image Plane      | Infinity           |                    |                     |                |

Single lens data

| Lens | Start plane | Focal length |
| ---- | ----------- | ------------ |
| 1    | 1           | 3.155        |
| 2    | 3           | −4.356       |
| 3    | 5           | 11.920       |

TABLE 3-continued

Embodiment 3
Unit mm

| 4 | 7 | −18.502 |
|---|---|---|
| 5 | 9 | 14.828 |

Aspheric data

|  | First surface | Second surface | Third surface | Fourth surface | Fifth surface |
|---|---|---|---|---|---|
| k | 0.000E+00 | 0.000E+00 | 0.000E+00 | 0.000E+00 | 0.000E+00 |
| A4 | −2.275E−02 | 2.199E−02 | −6.964E−02 | −1.369E−01 | −4.238E−02 |
| A6 | −5.843E−04 | −8.795E−02 | 1.447E−02 | 8.867E−02 | 1.425E−02 |
| A8 | −2.539E−02 | 5.423E−02 | −3.991E−03 | −7.082E−02 | −7.989E−03 |
| A10 | −1.798E−03 | −1.989E−02 | 1.284E−02 | 2.302E−02 | 2.170E−03 |
| A12 | 0.000E+00 | 0.000E+00 | 0.000E+00 | 0.000E+00 | 2.933E−03 |
| A14 | 0.000E+00 | 0.000E+00 | 0.000E+00 | 0.000E+00 | 3.166E−03 |
| A16 | 0.000E+00 | 0.000E+00 | 0.000E+00 | 0.000E+00 | −1.031E−03 |

|  | Sixth surface | Seventh surface | Eighth surface | Ninth surface | Tenth surface |
|---|---|---|---|---|---|
| k | 0.000E+00 | 0.000E+00 | −4.987E+01 | −5.644E+00 | −3.842E+00 |
| A4 | −5.406E−02 | 1.986E−02 | 4.320E−02 | −9.994E−02 | −9.005E−02 |
| A6 | −3.648E−02 | −7.393E−03 | −3.016E−02 | −8.475E−02 | 1.979E−02 |
| A8 | 3.714E−02 | 3.961E−02 | 3.442E−03 | 1.463E−02 | −3.244E−03 |
| A10 | −4.356E−03 | −2.114E−02 | −8.343E−04 | −8.973E−04 | 3.793E−04 |
| A12 | −9.307E−03 | 4.328E−03 | 0.000E+00 | −8.734E−04 | −9.497E−06 |
| A14 | 5.989E−03 | 0.000E+00 | 0.000E+00 | −1.346E−04 | −8.528E−06 |
| A16 | 1.210E−03 | 0.000E+00 | 0.000E+00 | 5.922E−05 | 9.805E−07 |

The image pickup lens according to Embodiment 3 satisfies all conditional expressions (1) through (9), as shown in Table 5.

Figure 6:
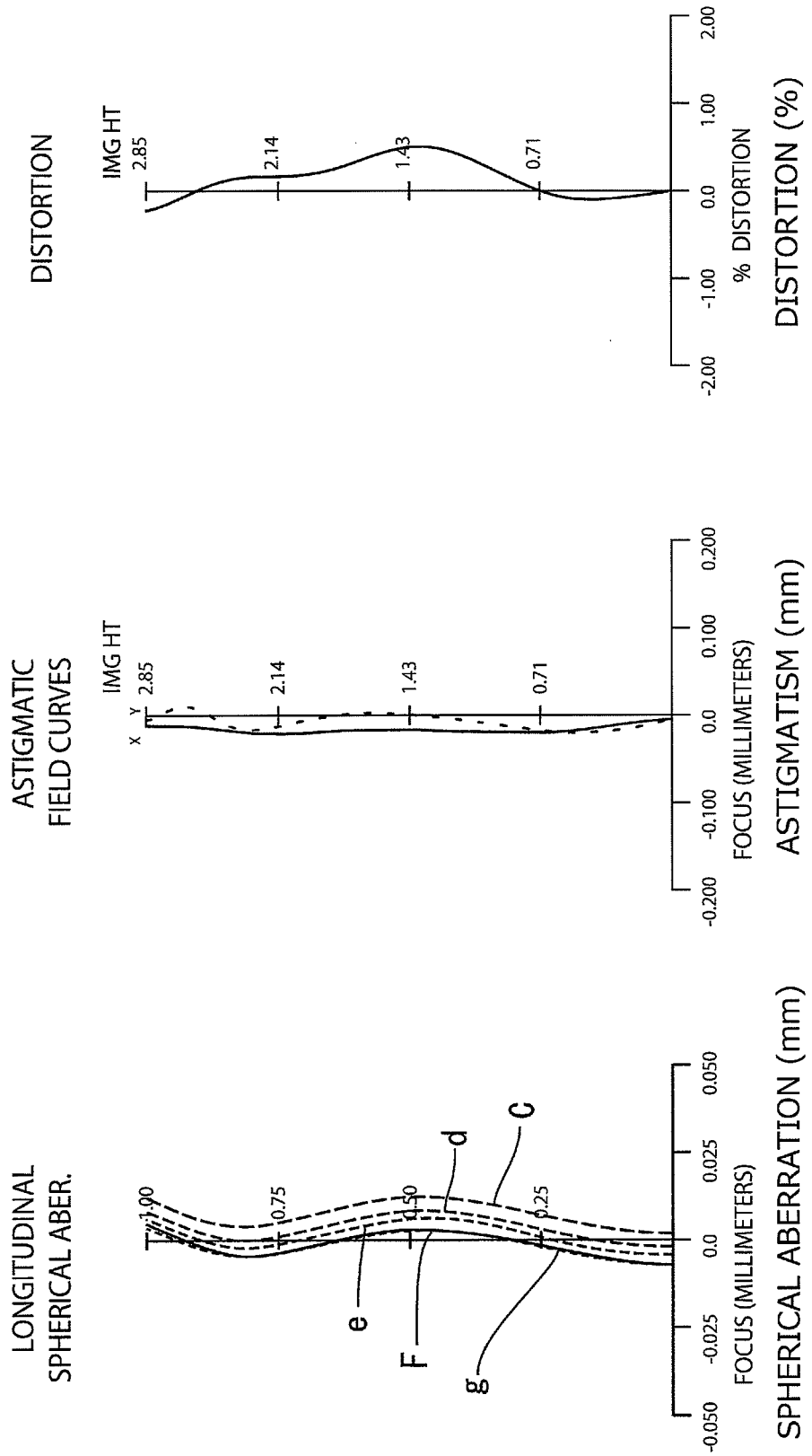
FIG. 6 is a view showing a spherical aberration, an astigmatism and a distortion of the image pickup lens according to Embodiment 3.
Figure 7:
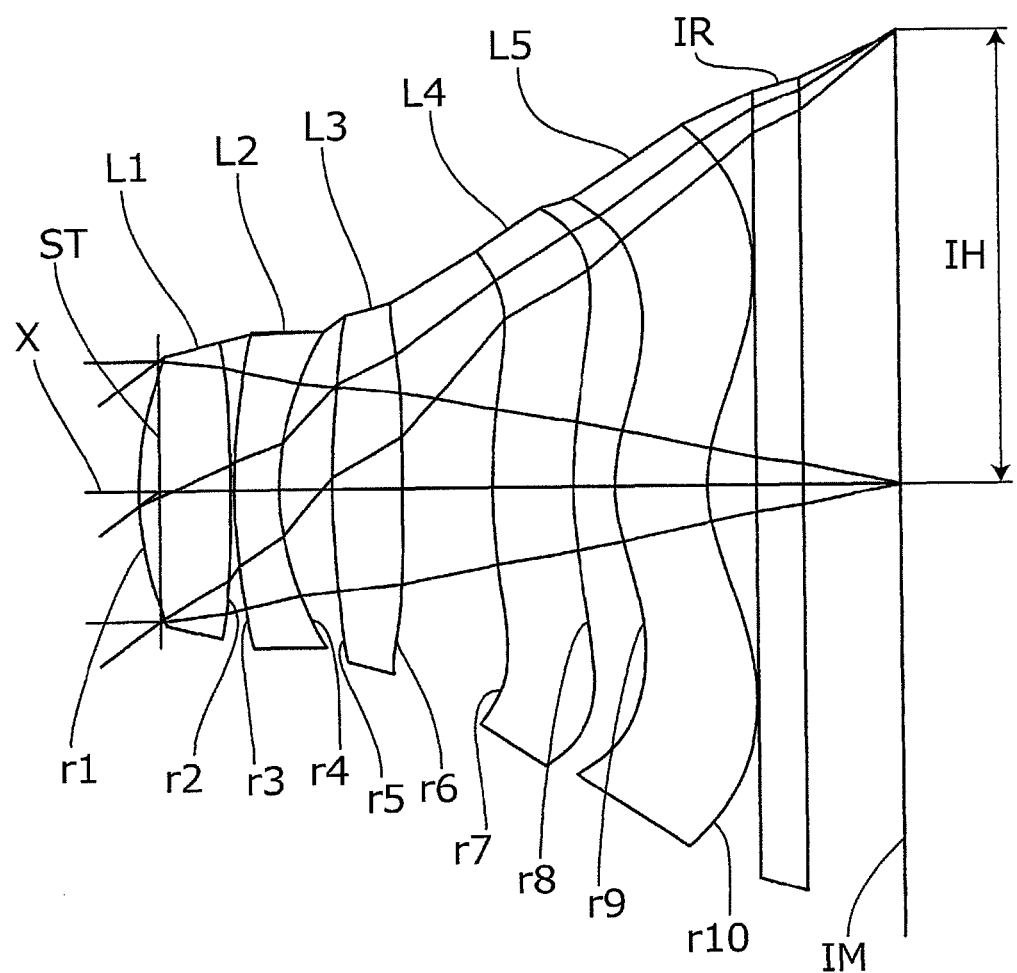
FIG. 7 is a view showing a general configuration of the image pickup lens according to Embodiment 4.

FIG. 6 shows a spherical aberration (mm), an astigmatism (mm), and a distortion (%) of the image pickup lens according to Embodiment 3. These aberration diagrams illustrate the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 6, it can be seen that the respective aberrations are satisfactorily corrected.

Further, the total track length TTL is as short as 4.936 mm and a ratio thereof to the maximum image height IH (TTL/2IH) is 0.864, so that downsizing is realized even in a five-lens configuration. Moreover, the F-value is as bright as 2.40, and the half angle of field of the lens is approximately 35°, which means that a relatively wide angle of field is achieved.

Embodiment 4

Basic lens data will be shown in Table 4 below.

TABLE 4

Embodiment 4
Unit mm f = 3.927
Fno = 2.41
ω = 35.99
IH = 2.856

Surface data

| Surface No. i | Curvature radius r | Surface distance d | Refractive index Nd | Abbe number vd |
|---|---|---|---|---|
| (Object surface) | Infinity | Infinity | | |
| Stop | Infinity | −0.13 | | |
| 1* | 1.9896 | 0.5794 | 1.535 | 56.160 |
| 2* | −11.5862 | 0.023 | | |
| 3* | 3.4089 | 0.28 | 1.635 | 23.911 |
| 4* | 1.5053 | 0.338 | | |
| 5* | 5.2349 | 0.444 | 1.535 | 56.160 |
| 6* | −82.435 | 0.5669 | | |
| 7* | 4.1708 | 0.5071 | 1.535 | 56.160 |
| 8* | 2.338 | 0.2655 | | |
| 9* | 1.0415 | 0.5817 | 1.535 | 56.160 |
| 10* | 1.0059 | 0.31 | | |
| 11 | Infinity | 0.3 | 1.517 | 64.198 |
| 12 | Infinity | 0.6061 | | |
| Image Plane | Infinity | | | |

TABLE 4-continued

Embodiment 4
Unit mm

Single lens data

| Lens | Start plane | Focal length |
|---|---|---|
| 1 | 1 | 3.211 |
| 2 | 3 | −4.457 |
| 3 | 5 | 9.185 |
| 4 | 7 | −10.970 |
| 5 | 9 | 11.643 |

Aspheric data

| | First surface | Second surface | Third surface | Fourth surface | Fifth surface |
|---|---|---|---|---|---|
| k | 0.000E+00 | 0.000E+00 | 0.000E+00 | 0.000E+00 | 0.000E+00 |
| A4 | −2.419E−02 | 2.136E−02 | −6.859E−02 | −1.355E−01 | −4.235E−02 |
| A6 | 1.044E−03 | −9.114E−02 | 1.963E−02 | 9.104E−02 | 1.591E−02 |
| A8 | −2.606E−02 | 5.387E−02 | 1.060E−03 | −6.635E−02 | −6.362E−03 |
| A10 | −7.802E−03 | −1.741E−02 | 1.743E−02 | 3.038E−02 | 3.044E−03 |
| A12 | 0.000E+00 | 0.000E+00 | 0.000E+00 | 0.000E+00 | 2.840E−03 |
| A14 | 0.000E+00 | 0.000E+00 | 0.000E+00 | 0.000E+00 | 3.269E−03 |
| A16 | 0.000E+00 | 0.000E+00 | 0.000E+00 | 0.000E+00 | −1.002E−03 |

| | Sixth surface | Seventh surface | Eighth surface | Ninth surface | Tenth surface |
|---|---|---|---|---|---|
| k | 0.000E+00 | 0.000E+00 | −5.420E+01 | −5.811E+00 | −4.075E+00 |
| A4 | −5.046E−02 | 1.653E−02 | 3.501E−02 | −1.150E−01 | −9.008E−02 |
| A6 | −3.240E−02 | −7.552E−02 | −2.988E−02 | −2.995E−03 | 1.957E−02 |
| A8 | 3.952E−02 | 3.918E−02 | 4.663E−03 | 1.418E−02 | −3.245E−03 |
| A10 | −3.934E−03 | −2.084E−02 | −1.007E−03 | −9.493E−04 | 3.758E−04 |
| A12 | −9.838E−03 | 4.570E−03 | 0.000E+00 | −8.722E−04 | −1.061E−05 |
| A14 | 6.026E−03 | 0.000E+00 | 0.000E+00 | −1.338E−04 | −8.592E−06 |
| A16 | 1.288E−03 | 0.000E+00 | 0.000E+00 | 5.943E−05 | 1.045E−06 |

The image pickup lens according to Embodiment 4 satisfies all conditional expressions (1) through (9), as shown in Table 5.

Figure 8:
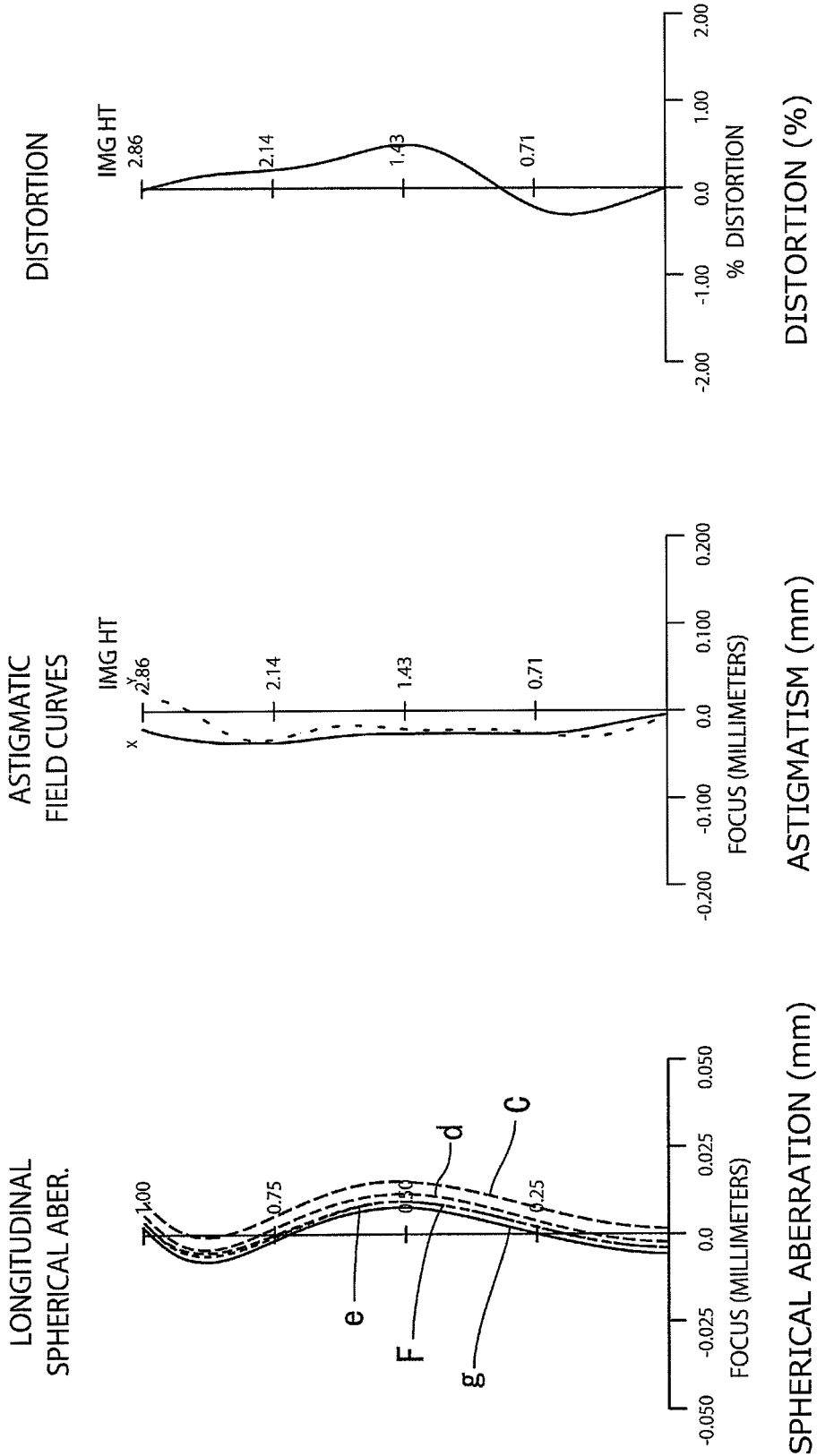
FIG. 8 is a view showing a spherical aberration, an astigmatism and a distortion of the image pickup lens according to Embodiment 4.

FIG. 8 shows a spherical aberration (mm), an astigmatism (mm), and a distortion (%) of the image pickup lens according to Embodiment 4. These aberration diagrams illustrate the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 8, it can be seen that the respective aberrations are satisfactorily corrected.

Further, the total track length TTL is as short as 4.693 mm and a ratio thereof to the maximum image height IH (TTL/2IH) is 0.822, so that downsizing is realized even in a five-lens configuration. Moreover, the F-value is as bright as 2.41, and the half angle of field of the lens is approximately 36°, which means that a relatively wide angle of field is achieved.

The image pickup lens according to the present embodiments has a half angle of field ω of approximately 37°, which enables to capture a relatively wide angle of field, and simultaneously realizes both ensuring of a wide angle of field and back focus and realizing of a wide angle of field and favorable correction of aberration (especially distortion), which had been difficult to achieve according to the prior art.

Table 5 shows the values of conditional expressions (1) through (9) according to Embodiments 1 through 4.

TABLE 5

| | Embodiment 1 | Embodiment 2 | Embodiment 3 | Embodiment 4 |
|---|---|---|---|---|
| f | 4.109 | 4.132 | 4.073 | 3.927 |
| f1 | 3.240 | 3.269 | 3.155 | 3.211 |
| f2 | −4.422 | −4.456 | −4.356 | −4.457 |
| f3 | 10.555 | 12.325 | 11.920 | 9.185 |
| f4 | −8.007 | −11.651 | −18.502 | −10.970 |
| f5 | 6.973 | 8.607 | 14.828 | 11.643 |
| v1 | 56.160 | 56.160 | 56.160 | 56.160 |
| v2 | 25.577 | 25.577 | 25.577 | 23.911 |
| TTL | 4.991 | 5.093 | 4.936 | 4.693 |
| r1 | 2.149 | 2.317 | 2.175 | 1.990 |
| r2 | −8.215 | −6.466 | −6.924 | −11.586 |
| IH | 2.856 | 2.856 | 2.856 | 2.856 |
| ω | 34.893 | 34.665 | 35.068 | 35.992 |
| Fno | 2.20 | 2.05 | 2.40 | 2.41 |
| Value of conditional expressions | | | | |
| (1) $45 < v1 < 90$ | 56.16 | 56.16 | 56.16 | 56.16 |
| (2) $22 < v2 < 35$ | 25.58 | 25.58 | 25.58 | 23.91 |
| (3) $2.0 < v1/v2 < 2.6$ | 2.196 | 2.196 | 2.196 | 2.349 |
| (4) $0.7 < f1/f < 0.9$ | 0.789 | 0.791 | 0.775 | 0.818 |
| (5) $-1.3 < f2/f < -0.9$ | −1.076 | −1.078 | −1.069 | −1.135 |
| (6) $1.1 < TTL/f < 1.3$ | 1.215 | 1.233 | 1.212 | 1.195 |
| (7) $-0.4 < r1/r2 < -0.15$ | −0.262 | −0.358 | −0.314 | −0.172 |
| (8) $-5.0 < f4/f < -1.75$ | −1.949 | −2.820 | −4.543 | −2.793 |
| (9) $1.5 < f5/f < 4.0$ | 1.697 | 2.083 | 3.641 | 2.965 |
| TTL/2IH | 0.874 | 0.892 | 0.864 | 0.822 |

INDUSTRIAL APPLICABILITY

As described, by applying the image pickup lens having a five-lens configuration according to the respective embodiments of the present invention to optical systems built into image pickup devices mounted on portable terminals such as cellular phones and smartphones, PDAs (Personal Digital Assistances), and game machines, enhanced performance and downsizing of the camera can be achieved simultaneously.

The effects of the present invention are as follows.

The present invention enables to provide an image pickup lens where various aberrations are corrected preferably, which can realize downsizing and thinning, which has a relatively wide angle of field and is bright.

Further, by forming all the lenses using plastic material, an image pickup lens suitable for mass production and requiring lower costs can be acquired.

What is claimed is:

1. An image pickup lens composed of five lenses for a solid imaging element, comprising, in order from an object side to an image side, a first lens having a positive refractive power with a convex surface facing the object side, and a second lens having a negative refractive power with a concave surface facing the image side;

wherein the first lens and the second lens satisfy following conditional expressions (1), (2) and (3);

$$45 < v1 < 90 \quad (1)$$

$$22 < v2 < 35 \quad (2)$$

$$2.0 < v1/v2 < 2.6 \quad (3)$$

where v1 represents an Abbe number of the first lens, and v2 represents an Abbe number of the second lens, wherein the image pickup lens further comprises a third lens having a positive refractive power with a convex surface facing the object side near an optical axis, a fourth lens having both sides formed as aspheric surfaces and having a negative refractive power with a concave surface facing the image side near the optical axis, and a fifth lens having both sides formed as aspheric surfaces and having a positive refractive power with a concave surface facing the image side near the optical axis.

2. The image pickup lens according to claim 1, satisfying a following conditional expression (4)

$$0.7 < f1/f < 0.9 \quad (4)$$

where f represents a focal length of the overall optical system of the image pickup lens, and f1 represents a focal length of the first lens.

3. The image pickup lens according to claim 2, satisfying a following conditional expression (5):

$$-1.3 < f2/f < -0.9 \quad (5)$$

where f2 represents a focal length of the second lens, and f represents a focal length of the overall optical system of the image pickup lens.

4. The image pickup lens according to claim 3, wherein an aperture stop is arranged on an object side of the first lens.

5. The image pickup lens according to claim 3, satisfying a following conditional expression (8):

$$-5.0 < f4/f < -1.75 \quad (8)$$

where f4 represents a focal length of the fourth lens, and f represents a focal length of the overall optical system of the image pickup lens.

6. The image pickup lens according to claim 5, satisfying a following conditional expression (9):

$$1.5 < f5/f < 4.0 \quad (9)$$

where f5 represents a focal length of the fifth lens, and f represents a focal length of the overall optical system of the image pickup lens.

7. The image pickup lens according to claim 1, satisfying a following conditional expression (5):

$$-1.3 < f2/f < -0.9 \quad (5)$$

where f2 represents a focal length of the second lens, and f represents a focal length of the overall optical system of the image pickup lens.

8. The image pickup lens according to claim 7, wherein an aperture stop is arranged on an object side of the first lens.

9. The image pickup lens according to claim 7, satisfying a following conditional expression (8):

$$-5.0 < f4/f < -1.75 \quad (8)$$

where f4 represents a focal length of the fourth lens, and f represents a focal length of the overall optical system of the image pickup lens.

10. The image pickup lens according to claim 9, satisfying a following conditional expression (9):

$$1.5 < f5/f < 4.0 \quad (9)$$

where f5 represents a focal length of the fifth lens, and f represents a focal length of the overall optical system of the image pickup lens.

11. The image pickup lens according to claim 1, wherein the fourth lens and the fifth lens are each a meniscus lens having a concave surface facing the image side near the optical axis, and having a pole-change point other than on the optical axis on the object side surface and the image side surface thereof.

12. The image pickup lens according to claim 1, satisfying a following conditional expression (6):

$$1.1 < TTL/f < 1.3 \quad (6)$$

where TTL represents a distance on the optical axis from the object side surface of the first lens having a filter removed to the imaging surface, and f represents a focal length of the overall optical system of the image pickup lens.

13. The image pickup lens according to claim 1, wherein the first lens is a biconvex lens, and satisfies a following conditional expression (7):

$$-0.40 < r1/r2 < -0.15 \quad (7)$$

where r1 represents a curvature radius of an object side surface of the first lens, and r2 represents a curvature radius of an image side surface of the first lens.

14. The image pickup lens according to claim 1, wherein the first lens, the second lens, the third lens, the fourth lens and the fifth lens are formed of plastic material, the first lens, the third lens, the fourth lens and the fifth lens being formed of a cycloolefin-based plastic material, and the second lens being formed of polycarbonate.

15. An image pickup lens composed of five lenses for a solid imaging element, comprising, in order from an object side to an image side, a first lens having a positive refractive power with a convex surface facing the object side, a second lens having a negative refractive power, a third lens having a positive refractive power, a fourth lens having both sides formed as aspheric surfaces and having a negative refractive power, and a fifth lens having both sides formed as aspheric surfaces and having a positive refractive power;

wherein conditional expressions (5) and (8) below are satisfied:

$$-1.3 < f2/f < -0.9 \quad (5)$$

$$-5.0 < f4/f < -1.75 \quad (8)$$

where f represents a focal length of the overall optical system of the image pickup lens, f2 represents a focal length of the second lens, and f4 represents a focal length of the fourth lens.

16. The image pickup lens according to claim 15, satisfying following conditional expressions (1), (2), and (3):

$$45 < v1 < 90 \quad (1)$$

$$22 < v2 < 35 \quad (2)$$

$$2.0 < v1/v2\ 21\ 2.6 \quad (3)$$

where v1 represents an Abbe number of the first lens, and v2 represents an Abbe number of the second lens.

17. The image pickup lens according to claim 15, wherein the second lens having a concave surface facing the image side near the optical axis, and the third lens having a convex surface facing the object side near the optical axis.

18. The image pickup lens according to claim 15, wherein the fourth lens and the fifth lens are each a meniscus lens having a concave surface facing the image side near the optical axis, and having a pole-change point other than on the optical axis on the object side surface and the image side surface thereof.

* * * * *